Patented Sept. 6, 1949

2,481,022

UNITED STATES PATENT OFFICE 2,481,022

PRODUCTION OF CYANINE DYESTUFFS

John David Kendall and Frank Peter Doyle, Ilford, England, assignors to Ilford Limited, Ilford, England, a British company No Drawing. Application July 1, 1946, Serial No. 680,821. In Great Britain July 3, 1945

9 Claims. (Cl. 260—240)

This invention relates to the production of cyanine dyestuffs and to photographic emulsions containing such dyestuffs.

According to this invention there are produced dyestuffs of the type having the general formula $$\underset{R_1}{\overset{\lceil---D_2---\rceil}{N}}=(CH-CH)_n=\overset{R}{\underset{X}{C}}-CH=\overset{CH_2-C-CH_2}{\underset{|}{C}}-CH-\overset{\lceil---D_2---\rceil}{\underset{|}{C}}-CH=\overset{R}{\underset{R_2}{C}}-(CH=CH)_n-N \quad (1)$$

where in which the R groups are selected from hydrogen atoms, alkyl groups and aryl groups, $D_2$ is the residue of a heterocyclic nitrogen ring selected from the class consisting of thiazole, selenazole and their polycyclic homologues, thiazoline, selenazoline, diazines and diazoles, $R_1$ and $R_2$ are alkyl or aralkyl groups (which may themselves be substituted, e. g. by hydroxy groups), and $n$ is nought or one.

It will be noted that the dyestuffs are symmetrical in structure.

Dyesuffs of Formula 1 are prepared by condensing a cyclohexane 1.3-dione or a $\Delta^{2.3}$-[3-alkyl-(or aralkyl)-thio] cyclohexenone (1) (prepared as described in co-pending application No. 680,822, filed July 1, 1946, now Patent No. 2,465,882, issued March 29, 1949, corresponding to British patent application No. 16,877/45) with an alkyl or aralkyl quaternary salt of a heterocyclic nitrogen compound of the class stated above containing a reactive methylene group in $\alpha$ or $\gamma$ position to the quaternary nitrogen atom, the reaction being effected by heating the reagents together in the presence of a base. The $\Delta^{2,3}$-[-3-alkyl-(or aralkyl)-thiol] cyclohexenone (1) compounds can be made by reacting a cyclic 1,3-diketone of the general formula $$\overset{\lceil---D_2---\rceil}{\underset{|}{CO-CH_2-CO}}$$

where $D_2$ is the residue of a cyclohexane 1,3-dione ring (of which the methylene groups constituting $D_2$ may be hydrocarbon-substituted), on treating with an alkyl, aryl or aralkyl mercaptan ($R_6SH$) in the presence of a strong acid (HA) are converted to mono thioethers of the type of $$\overset{\lceil---D_2---\rceil}{\underset{|}{CO-CH=C-SR_6}}$$

The reaction with a cyclohexane 1.3-dione only gives small yields, and the reaction with $\Delta^{2.3}$-[3-alkyl-(or aralykyl)-thio] cyclohexenone (1) is much preferred. The general preferred procedure is to react two molecular equivalents of the heterocyclic nitrogen base with two molecular equivalents of an alkyl salt to form the quaternary salt of the base and to fuse this quaternary salt, or the mixture of the base and alkyl salt, with one molecular equivalent of the cyclohexane 1.3-dione or cyclohexenone compound, and then to heat the fusion mixture with a solvent (e. g. pyridine or alcohol) preferably in the presence of a small quantity of a strong base such as triethylamine, the quantity of the strong base depending on the ease or otherwise with which the reaction takes place.

The production of the dyestuffs by these processes forms an essential part of the present invention.

The dyestuffs produced are photographic sensitising dyestuffs and the invention therefore also includes silver halide photographic emulsions containing such dyestuffs in sensitising amount.

The residue $D_1$ may be the grouping

—$CH_2$—$CH_2$—$CH_2$— or any corresponding grouping in which the hydrogen atoms are substituted by hydrocarbon groups, e. g. methyl, ethyl, propyl, isopropyl, styryl or phenyl.

Typical $\Delta^{2.3}$-[3-alkyl-thio] cyclohexenone (1) compounds which may be employed are:

$\Delta^{2;3}$- 3-ethyl thio-5:5-dimethyl) cyclohexenone (1)
$\Delta^{2;3}$-(3-ethyl thio-5-phenyl cyclohexenone (1)
$\Delta^{2;3}$-(3-ethyl thio-5-methyl cyclohexenone (1)
$\Delta^{2;3}$-(3-ethyl thio) cyclohexenone (1)

and analogous compounds produced by the method of co-pending application No. 680,822 corresponding to British patent application No. 16,877/45, from 5-isopropyl-cyclohexane dione (1:3)
4:5:5-trimethyl cyclohexane dione (1:3)
4-phenyl-5:5-dimethyl cyclohexane dione (1:3)
5-styryl cyclohexane dione (1:3)

The residue $D_2$ may be, for example, the residue of thiazole, selenazole and their polycyclic homologues such as those of the benzene and naphthalene series; diazines such as pyrimidines and quinazolines; diazole such as thio $\beta\beta'$ diazole; selenazolines and thiazolines. The polycyclic compounds of these series may also be substituted in the carbocyclic ring with one or more groups such as alkyl, aryl, amino, hydroxy, alkoxy and methylene dioxy groups, or by halogen atoms.

The groups $R_1$ and $R_2$ may be any alkyl or aralkyl groups, e. g. methyl, ethyl, propyl and higher alkyl groups and benzyl.

In the alkylthio or aralkylthio grouping the alkyl or aralkyl group may be any of those mentioned above. However, from the point of view of ease of production of the cyclohexenone compound and of its reactivity in the process of this invention, the thio grouping is preferably ethylthio.

The quaternary salt employed is preferably an alkyl p-toluene sulphonate, though other alkyl salts may be used, e. g. alkyl halides or sulphates. When the dyestuff is obtained as the alkyl sulphate or alkyl p-toluene sulphonate it may be converted to a less soluble salt of another acid by treatment with a solution of an alkali salt of such other acid, e. g. potassium chloride, bromide, iodide or perchlorate.

The following examples, in which the parts are by weight, illustrate the invention:

Example 1

Preparation of the dyestuff of the formula:

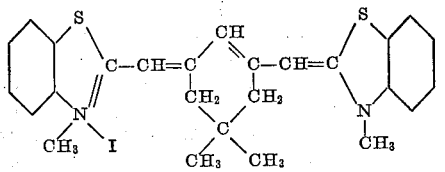

(2)

1.4 parts of $\Delta^{2:3}$-(3-ethylthio-5:5'dimethyl) cyclohexenone (1), 1.86 parts of 1-methyl benzthiazole and 2.33 parts of methyl-p-toluene sulphonate were fused together for 2 hours at 100° C. 20 parts of pyridine were added and the mixture refluxed to dissolve the quaternary salts. 1.1 parts of triethylamine were then added, and after refluxing 30 minutes the deep blue solution was poured into aqueous potassium iodide solution. On dilution the dyestuff crystallised out. It was removed by filtration and washed with hot water, hot benzene, ethyl alcohol and ether, and then recrystallised from 24 parts of methyl alcohol to separate from a small amount of symmetrical carbocyanine that was also present. The dyestuff was obtained as shining green crystals, M. Pt. 259° C. (with decomposition).

Example 2

Preparation of the dyestuff of the formula:

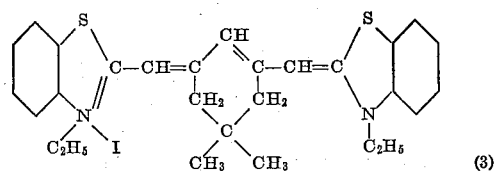

(3)

7 parts of $\Delta^{2:3}$-(3-ethylthio-5:5'dimethyl) cyclohexenone (1), 7.5 parts of 1-methyl benzthiazole and 10 parts of ethyl-p-toluene sulphonate were fused at 140–150° C. for 3 hours. 150 parts of pyridine were added and the mixture boiled. 5 parts of triethylamine were then added, and after boiling the solution for ¾ hour it was poured into potassium iodide solution, cooled, filtered and the dyestuff washed and recrystallised as in Example 1. The dyestuff was obtained as glittering green crystals, M. Pt. 190° C. (with decomposition).

Example 3

Preparation of the dyestuff of the formula:

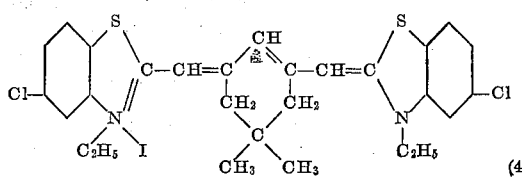

(4)

5.8 parts of $\Delta^{2:3}$-(3-ethylthio-5:5'dimethyl) cyclohexenone (1), 9.2 parts of 1-methyl-4-chlorbenzthiazole and 10 parts of ethyl-p-toluene sulphonate were fused together at 140–150° C. for 3 hours. 100 parts of pyridine were added and the mixture boiled. 5 parts of triethylamine were then added and the mixture refluxed for 30 minutes. A further 5 parts of triethylamine was added, and after 30 minutes' boiling the blue-green solution was poured into aqueous potassium iodide solution. The dyestuff was isolated as in Example 1 and obtained as bronze red crystals, M. Pt. 249° C. (with decomposition).

Example 4

Preparation of the dyestuff of the formula:

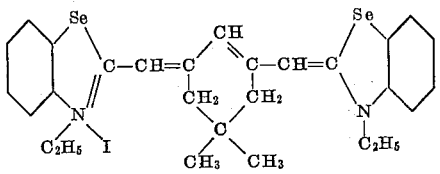

(5)

5.8 parts of $\Delta^{2:3}$-(3-ethylthio-5:5'dimethyl) cyclohexenone (1), 9.8 parts of 1-methyl benzselenazole and 10 parts of ethyl-p-toluene sulphonate were fused at 140–150° for 3 hours. The quaternary salt was dissolved in 100 parts of pyridine and 5 parts of triethylamine added. After refluxing for half an hour a further 2.5 parts of triethylamine were added, and after 30 minutes the blue-green solution was poured into aqueous potassium iodide solution. The dyestuff was isolated as in Example 1 and obtained as green crystals, M. Pt. 183° C. (with decomposition).

Example 5

Preparation of the dyestuff of the formula:

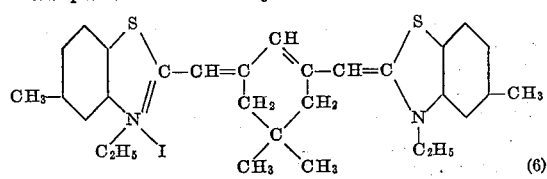

(6)

7 parts of 5:5-dimethyl-cyclohexane dione (1:3), 16.5 parts of 1:4 dimethyl benzthiazole and 21 parts of ethyl-p-toluene sulphonate were fused at 150° C. for 4 hours. 150 parts of pyridine and 5 parts of triethylamine were added and the mixture refluxed for 30 minutes and then poured into aqueous potassium iodide solution. The dyestuff was isolated as in Example 1 and was obtained as bright green crystals, M. Pt. 255° C. (with decomposition).

Example 6

Preparation of the dyestuff of the formula:

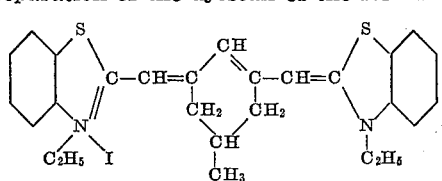

(7)

1.7 parts of $\Delta^{2:3}$-(3-ethylthio-5-methyl) cyclohexenone (1), 3 parts of 1-methyl benzthiazole, and 4 parts of ethyl-p-toluene sulphonate were fused for 3 hours at 150–160° C., 15 parts of pyridine were added and the mixture refluxed for 15 minutes. 1.1 parts of triethylamine were then added and the whole refluxed for a further 15 minutes and poured into aqueous potassium iodide solution. The dyestuff, isolated and purified as in Example 1, was obtained as light green crystals, M. Pt. 248° C. (with decomposition).

*Example 7*

Preparation of the dyestuff of the formula:

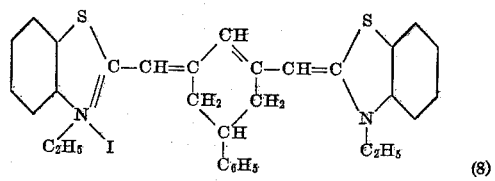
(8)

8.4 parts of $\Delta^{2:3}$-(3-ethylthio-5-phenyl) cyclohexenone (1), 7.5 parts of 1-methyl benzthiazole and 10 parts of ethyl-p-toluene sulphonate were fused together for 4 hours at 150–160° C. 100 parts of pyridine were then added, the mixture refluxed for ten minutes, 2.5 parts of triethylamine were added and after a further 15 minutes the dark green-blue solution was poured into potassium iodide when, after cooling, the dyestuff crystallised out and was filtered, washed and crystallised as in Example 1 to give the dyestuff as dark green crystals, M. Pt. 264° (with decomposition).

In a modification of this process the 1-methyl benzthiazole ethyl p-toluene sulphonate is prepared first and then fused with the cyclohexenone compound. This modification was found to give an increased yield of the product.

*Example 8*

Preparation of the dyestuff of the formula:

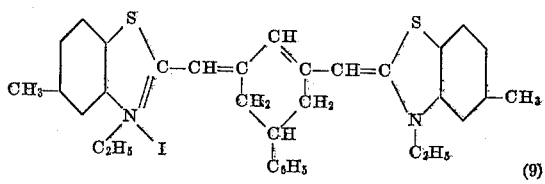
(9)

9.4 parts of 5-phenyl cyclohexane dione (1:3), 16.5 parts of 1:4 dimethyl benzthiazole and 2.1 gms. of ethyl p-toluene sulphonate were fused together for 4 hours at 150° C. 150 parts of pyridine and 5 parts of triethylamine were added and the mixture refluxed for 30 minutes and then poured into aqueous potassium iodide solution. The dyestuff was isolated as in Example 1 and was obtained as bronze crystals, M. Pt. 279° C. (with decomposition).

*Example 9*

Preparation of the dyestuff of the formula:

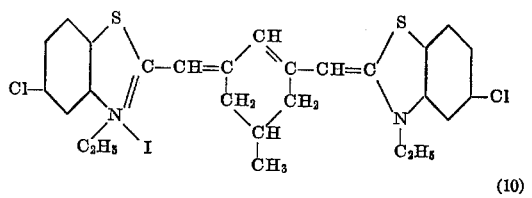
(10)

1.85 parts of 1-methyl-4-chlor benzthiazole and 2.00 parts of ethyl p-toluene sulphonate were fused at 140° for 2 hours. 0.85 parts of $\Delta^{2:3}$-(3-ethylthio-5-methyl) cyclohexenone (1) were added and the mixture again fused for 2 hours at 150–160°. 20 parts of ethyl alcohol were added and the mixture warmed to form a solution. 2 parts of triethylamine were then added and the whole boiled for 45 minutes and then poured into aqueous potassium iodide solution. The dyestuff was isolated as in Example 1 when it was obtained as mauve crystals, M. Pt. 258° (with decomposition).

*Example 10*

Preparation of the dyestuff of the formula:

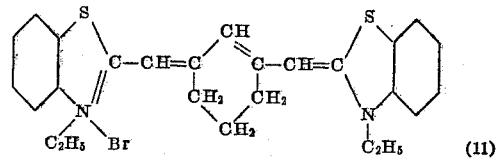
(11)

1.5 parts of 1-methyl benzthiazole, 0.8 part of $\Delta^{2:3}$-(3-ethylthio) cyclohexenone (1) and 2.0 parts of ethyl p-toluene sulphonate were fused together at 150–160° C. for 3 to 4 hours. 15 parts of pyridine were added and the mixture warmed to form a solution. 2 parts of triethylamine were then added and after 30 minutes' refluxing the deep blue solution was poured into aqueous potassium bromide solution. The dyestuff was isolated as in Example 1 as blue needles with a green reflex, M. Pt. 234° C. (with decomposition). Sintering occurred at 169° C.

As already indicated the dyestuffs of this invention are valuable sensitisers for photographic silver halide emulsions. Thus the dyestuffs of the foregoing examples, incorporated in a gelatin silver iodobromide emulsion, impart a band of sensitivity, the region of maximum sensitivity being as follows:

Dyestuff of Example 1: Sensitising maximum, 6980 Å.
Dyestuff of Example 2: Sensitising maximum, 6980 Å.
Dyestuff of Example 3: Sensitising maximum, 7000 Å.
Dyestuff of Example 4: Sensitising maximum, 7000 Å.
Dyestuff of Example 5: Sensitising maximum, 7100 Å.
Dyestuff of Example 6: Sensitising maximum, 6950 Å.
Dyestuff of Example 7: Sensitising maximum, 7100 Å.
Dyestuff of Example 8: Sensitising maximum, 7100 Å.
Dyestuff of Example 9: Sensitising maximum, 6980 Å.
Dyestuff of Example 10: Sensitising maximum, 7000 Å.

What we claim is:

1. Process for the production of dyestuffs which comprises condensing a compound selected from the class consisting of cyclohexane 1:3-diones, $\Delta^{2:3}$-(3-alkylthio) cyclohexenone (1) and $\Delta^{2:3}$-(3-aralkylthio) cyclohexenone (1) with a compound selected from the class consisting of alkyl and aralkyl quaternary salts of heterocyclic nitrogen compounds of the class consisting of thiazole and selenazole the reaction being effected by heating the said reagents together in the presence of a base.

2. Process for the production of dyestuffs which comprises condensing a compound selected from the class consisting of cyclohexane 1:3-diones, $\Delta^{2:3}$-(3-alkylthio) cyclohexenone (1) and $\Delta^{2:3}$-(3-aralkylthio) cyclohexenone (1) with a compound selected from the class consisting of the alkyl p-toluene sulphonate salts of heterocyclic nitrogen compounds of the class conisting of thiazole and selenazole, the reaction being effected by heating the said reagents together in the presence of a base.

3. Process for the production of dyestuffs which comprises condensing a compound selected from the class consisting of cyclohexane 1:3-diones, $\Delta^{2:3}$-(3-alkylthio) cyclohexenone (1) and $\Delta^{2:3}$-(3-aralkylthio) cyclohexenone (1) with a compound selected from the class consisting of alkyl and aralkyl quaternary salts of heterocyclic nitrogen compounds of the class consisting of thiazole and selenazole, the reaction being effected by heating the said reagents together in the presence of a base, and a solvent for the reactants.

4. Process for the production of dyestuffs which comprises condensing a compound selected from the class consisting of cyclohexane 1:3-diones, $\Delta^{2:3}$-(3-alkylthio) cyclohexenone (1) and $\Delta^{2:3}$-(3-aralykylthio) cyclohexenone (1) with a compound selected from the class consisting of alkyl and aralkyl quaternary salts of heterocyclic nitrogen compounds of the class consisting of thiazole and selenazole, the reaction being effected by heating the reagents together in the presence of a base at least as strong as triethylamine.

5. Process for the production of dyestuffs which comprises condensing a $\Delta^{2:3}$-(3-ethylthio) cyclohexenone (1) compound with a compound selected from the class consisting of alkyl and aralkyl quaternary salts of heterocyclic nitrogen compounds of the class consisting of thiazole and selenazole, the reaction being effected by heating the said reagents together in the presence of a base.

6. Process for the production of dyestuffs which comprises condensing a $\Delta^{2:3}$-(3-ethylthio) cyclohexenone (1) compound with a compound selected from the class consisting of the alkyl p-toluene sulphonate salts of heterocyclic nitrogen compounds of the class consisting of thiazole and selenazole, the reaction being effected by heating the said reagents together in the presence of a base.

7. Process for the production of dyestuffs which comprises condensing a $\Delta^{2:3}$-(3-ethylthio) cyclohexenone (1) compound with a compound selected from the class consisting of alkyl and aralkyl quaternary salts of heterocyclic nitrogen compounds of the class consisting of thiazole and selenazole, the reaction being effected by heating the said reagents together in the presence of a base and a solvent for the reactants.

8. Process for the production of dyestuffs which comprises condensing a $\Delta^{2:3}$-(3-ethylthio) cyclohexenone (1) compound with a compound selected from the class consisting of alkyl and aralkyl quaternary salts of heterocyclic nitrogen compounds of the class consisting of thiazole and selenazole, the reaction being effected by heating the reagents together in the presence of a base at least as strong as triethylamine.

9. Dyestuffs having the general formula:

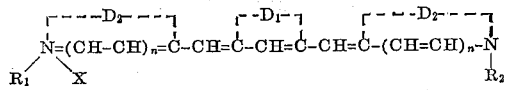

where $D_1$ is the residue of a cyclohexenone ring of which the hydrogen atoms attached to the three carbon atoms constituting $D_1$ may each be substituted by hydrocarbon groups, $D_2$ is the residue of a heterocyclic nitrogen ring selected from the class consisting of thiazole and selenazole, $R_1$ and $R_2$ are selected from the class consisting of alkyl and aralkyl groups and $n$ is selected from the class consisting of nought and one.

JOHN DAVID KENDALL.
FRANK PETER DOYLE.

REFERENCES CITED

The following references are of record in the file of this patent:

UNITED STATES PATENTS

| Number | Name | Date |
|---|---|---|
| 2,138,223 | Wilmanns | Nov. 29, 1938 |
| 2,166,736 | White et al. | July 18, 1939 |
| 2,263,749 | White et al. | Nov. 25, 1941 |
| 2,265,909 | Kendall | Dec. 9, 1941 |
| 2,322,015 | Hamer et al. | June 15, 1943 |
| 2,340,882 | Kendall | Feb. 8, 1944 |
| 2,342,546 | Kendall | Feb. 22, 1944 |
| 2,353,164 | Kendall et al. | July 11, 1944 |

OTHER REFERENCES

Chemical Abstracts, 16:3101 (Abstract of Brit. Med. Journal, 1922, I 514–515).

Chemical Abstracts 19:530 (Abstract of Proc. Roy. Soc., London, 96B 317–333, 1924).